US010839210B2

(12) United States Patent
Zhou

(10) Patent No.: US 10,839,210 B2
(45) Date of Patent: Nov. 17, 2020

(54) IRIS RECOGNITION METHOD, ELECTRONIC DEVICE AND COMPUTER-READABLE STORAGE MEDIUM

(71) Applicant: GUANGDONG OPPO MOBILE TELECOMMUNICATIONS CORP., LTD., Guangdong (CN)

(72) Inventor: Yibao Zhou, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 234 days.

(21) Appl. No.: 15/968,037

(22) Filed: May 1, 2018

(65) Prior Publication Data

US 2018/0365493 A1 Dec. 20, 2018

(30) Foreign Application Priority Data

Jun. 14, 2017 (CN) .......................... 2017 1 0447887

(51) Int. Cl.
*G06K 9/00* (2006.01)
(52) U.S. Cl.
CPC ..... *G06K 9/00617* (2013.01); *G06K 9/00302* (2013.01); *G06K 9/00597* (2013.01); *G06K 9/00906* (2013.01); *G06K 9/00261* (2013.01)
(58) Field of Classification Search
None
See application file for complete search history.

(56) References Cited

U.S. PATENT DOCUMENTS

| 5,802,220 A | 9/1998 | Black et al. |
| 2012/0300052 A1 | 11/2012 | Hanna et al. |
| 2013/0016882 A1* | 1/2013 | Cavallini ............... G06K 9/629 382/117 |
| 2014/0270412 A1 | 9/2014 | Ma et al. |
| 2016/0117839 A1* | 4/2016 | Kawahara ................ H04N 7/18 |
| 2016/0188958 A1* | 6/2016 | Martin ............... G06K 9/00228 382/118 |
| 2018/0260529 A1* | 9/2018 | Chun ..................... G16H 50/20 |

FOREIGN PATENT DOCUMENTS

| CN | 202956771 U | 5/2013 |
| CN | 103440479 A | 12/2013 |

(Continued)

OTHER PUBLICATIONS

Chinese Patent Application No. 201710447887.2 Office Action dated Mar. 20, 2019, 11 pages.

(Continued)

*Primary Examiner* — Chan S Park
*Assistant Examiner* — Elisa M Rice
(74) *Attorney, Agent, or Firm* — Lathrop GPM LLP

(57) ABSTRACT

Embodiments of the present disclosure provide an iris recognition method applied for an electronic device and includes: capturing a plurality of face image frames of an object to be recognized; determining whether a face contour of the object to be recognized changes based on the plurality of face image frames; and capturing an iris image of the object to be recognized to perform iris recognition when the face contour changes. Further, embodiments of the present disclosure provide an electronic device and a computer-readable storage medium.

14 Claims, 7 Drawing Sheets

(56) References Cited

FOREIGN PATENT DOCUMENTS

| CN | 104751110 A | 7/2015 |
|----|-------------|--------|
| CN | 105119723 A | 12/2015 |
| CN | 105184879 A | 12/2015 |
| CN | 105224932 A | 1/2016 |
| CN | 105354473 A | 2/2016 |
| CN | 105488462 A | 4/2016 |
| CN | 106485118 A | 3/2017 |
| CN | 107346419 A | 11/2017 |

OTHER PUBLICATIONS

Chinese Patent Application No. 201710447887.2 English translation of Office Action dated Mar. 20, 2019, 12 pages.

Thavalengal et al., Iris Authentication in Handheld Devices-Considerations for Constraint-Free Acquisition, IEEE Transactions on Consumer Electronics, vol. 61, No. 2, May 31, 2015, pp. 245-253.

European Patent Application No. 18165830.3 extended Search and Opinion dated Oct. 9, 2018, 9 pages.

PCT/CN2018/081434 English Translation of the International Search Report and Written Opinion dated Jun. 22, 2018, 10 pp.

Chinese Patent Application No. 201710447887.2 Office Action dated Jun. 19, 2020, 11 pages.

Chinese Patent Application No. 201710447887.2 English translation of Office Action dated Jun. 19, 2020, 13 pages.

Indian Patent Application No. 201834012281 Office Action dated Sep. 16, 2020, 7 pages.

\* cited by examiner

IRIS RECOGNITION METHOD, ELECTRONIC DEVICE AND COMPUTER-READABLE STORAGE MEDIUM

CROSS REFERENCE TO RELATED APPLICATION

This application is based upon and claims a priority to Chinese Patent Application Serial No. 201710447887.2, filed with the Status Intellectual Property Office of P. R. China on Jun. 14, 2017, the entire contents of which are incorporated herein by reference.

FIELD

The present disclosure relates to a field of biometric identification technologies, and more particularly to an iris recognition method, an electronic device and a computer-readable storage medium.

BACKGROUND

Iris recognition, as important identification, is unique, stable and highly secure. However, actually, an iris may be forged, thereby needing to improve security of iris recognition.

SUMMARY

An iris recognition method of the embodiments of the present disclosure may be applied for an electronic device. The iris recognition method includes: capturing a plurality of face image frames of an object to be recognized; determining whether a face contour of the object to be recognized changes based on the plurality of face image frames; and capturing an iris image of the object to be recognized to perform iris recognition when the face contour changes.

An electronic device of the embodiments of the present disclosure includes a capturing unit, a processor and an iris recognition module. The capturing unit is configured to capture a plurality of face image frames of an object to be recognized. The processor is configured to determine whether a face contour of the object to be recognized changes based on the plurality of face image frames. The iris recognition module is configured to capture an iris image of the object to be recognized to perform iris recognition when the face contour changes.

A computer-readable storage medium of the embodiments of the present disclosure includes computer programs configured to combine with an electronic device capable of photographing. The computer programs are configured be executed by a processor to perform the above iris recognition method.

Additional aspects and advantages of the embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of the embodiments of the present disclosure will become apparent and more readily appreciated from the following descriptions made with reference to the drawings, in which.

DETAILED DESCRIPTION

Figure 1:
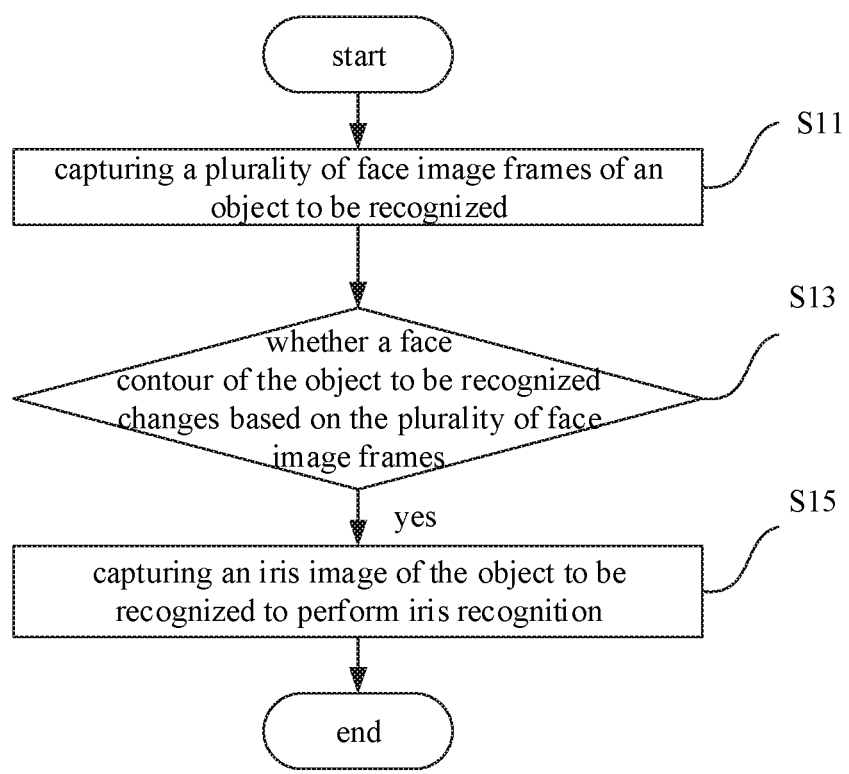
FIG. 1 is a flow chart illustrating an iris recognition method according to some embodiments of the present disclosure.

Embodiments of the present disclosure will be described in detail and examples of the embodiments are illustrated in the drawings. The same or similar elements and the elements having same or similar functions are denoted by like reference numerals throughout the descriptions. The embodiments described herein with reference to the drawings are explanatory, serve to explain the present disclosure, and are not construed to limit the embodiments of the present disclosure.

The present disclosure relates to an iris recognition method. The iris recognition method may be applied for an electronic device. The iris recognition method includes: capturing a plurality of face image frames of an object to be recognized; determining whether a face contour of the object to be recognized changes based on the plurality of face image frames; and capturing an iris image of the object to be recognized to perform iris recognition when the face contour changes.

The present disclosure relates to an electronic device. The electronic device includes a capturing unit, a processor and an iris recognition module. The capturing unit is configured to capture a plurality of face image frames of an object to be recognized. The processor is configured to determine whether a face contour of the object to be recognized changes based on the plurality of face image frames. The iris recognition module is configured to capture an iris image of the object to be recognized to perform iris recognition when the face contour changes.

The present disclosure relates to another electronic device. The electronic device includes one or more processors, a memory and one or more programs. The one or more programs have been stored in the memory. The one or more programs are configured to be executed by the one or more processors. The one or more programs include instructions for performing the above iris recognition method.

The present disclosure relates to a computer-readable storage medium. The computer-readable storage medium includes computer programs configured to combine with an electronic device capable of photographing. The computer programs are configured be executed by a processor to perform the above iris recognition method.

As illustrated in FIG. 1, an iris recognition method according to embodiments of the present disclosure may be applied for an electronic device. The iris recognition method may include the following acts.

S11, a plurality of face image frames of an object to be recognized are captured.

S13, it is determined whether a face contour of the object to be recognized changes based on the plurality of face image frames.

S15, an iris image of the object to be recognized is captured to perform iris recognition when the face contour changes.

Figure 2:
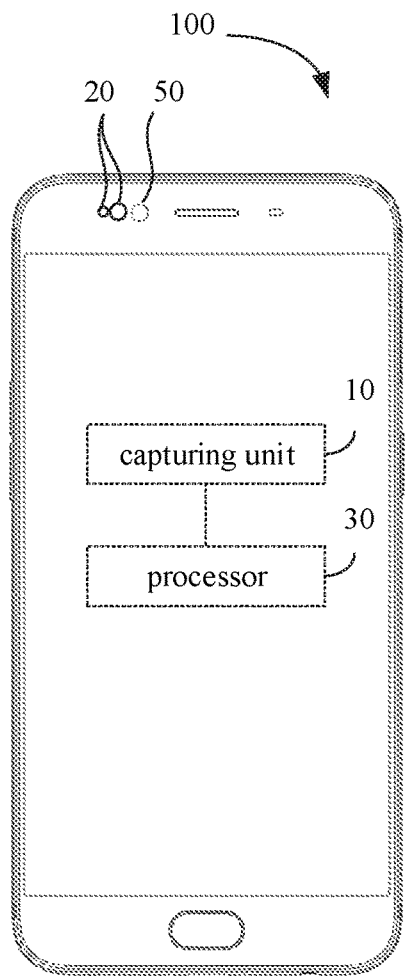
FIG. 2 is a block diagram illustrating an electronic device according to some embodiments of the present disclosure.

In some embodiments, the iris recognition method as illustrated in FIG. 1 according to embodiments of the present disclosure may be implemented by an electronic device 100 as illustrated in FIG. 2 according to embodiments of the present disclosure. The electronic device 100 according to embodiments of the present disclosure may include a capturing unit 10, a processor 30 and an iris recognition module 20. Act S11 may be implemented by the capturing unit 10. Act S13 may be implemented by the processor 30. Act S15 may be implemented by the iris recognition module 20.

That is, the capturing unit 10 may be configured to capture the plurality of face image frames of the object to be recognized. The processor 30 may be configured to determine whether the face contour of the object to be recognized changes based on the plurality of face image frames. The iris recognition module 20 may be configured to capture the iris image of the object to be recognized to perform the iris recognition when the face contour changes.

In some embodiments, the electronic device 100 may include a mobile phone, a tablet, a laptop, a smart watch, a smart wristband, smart glasses, a smart helmet, and the like. In specific embodiments of the present disclosure, the electronic device 100 may be the mobile phone.

Figure 3:
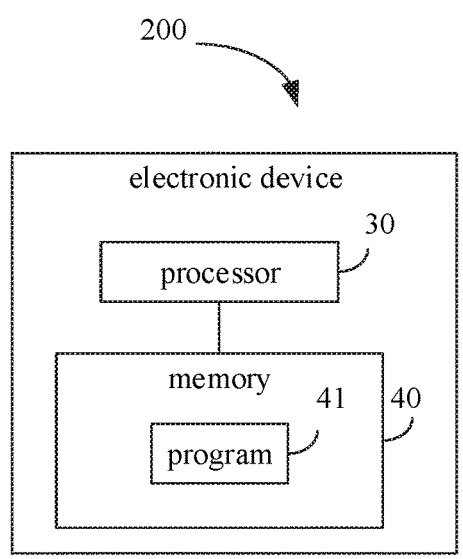
FIG. 3 is a block diagram illustrating an electronic device according to some embodiments of the present disclosure.

As illustrated in FIG. 3, in some embodiments, another electronic device 200 according to embodiments of the present disclosure may include one or more processors 30, a memory 40 and one or more programs 41. The one or more programs 41 have been stored in the memory 40. The one or more programs 41 are configured to be executed by the one or more processors 30. The one or more programs 41 may include instructions for performing the following acts.

S11, a plurality of face image frames of an object to be recognized are captured.

S13, it is determined whether a face contour of the object to be recognized changes based on the plurality of face image frames.

S15, an iris image of the object to be recognized is captured to perform iris recognition when the face contour changes.

It should be understood that, the iris recognition technologies are to perform identification by capturing the iris image, extracting features from the iris image and performing feature matching. However, the iris may be forged. For example, the iris recognition module 20 may capture the iris image by photographing a picture, a fake eye or the like. Therefore, it is necessary to detect whether the iris is a living one during an iris capturing process. With the iris recognition method of the embodiments of the present disclosure, during an iris recognition process, by determining whether the face contour of the object to be recognized changes to detect whether the iris corresponding to the captured iris image is a living one, the iris recognition may be performed when the iris is the living one, thereby enhancing the security of iris recognition.

The face contour varies with expression. Therefore, it may be determined whether the iris corresponding to the iris image captured by the iris recognition module 20 is the living one based on the change of the face contour. For example, when the object to be recognized makes a laughing expression and a normal expression (i.e. an expressionless state) respectively, the extracted correspondingly face contours are different. Determining whether the face contour changes includes: determining whether an area of the face contour of each of the plurality of face image frames is equal with each other, or determining whether a shape of the face contour of each of the plurality of face image frames matches with each other, or the like.

Figure 4:
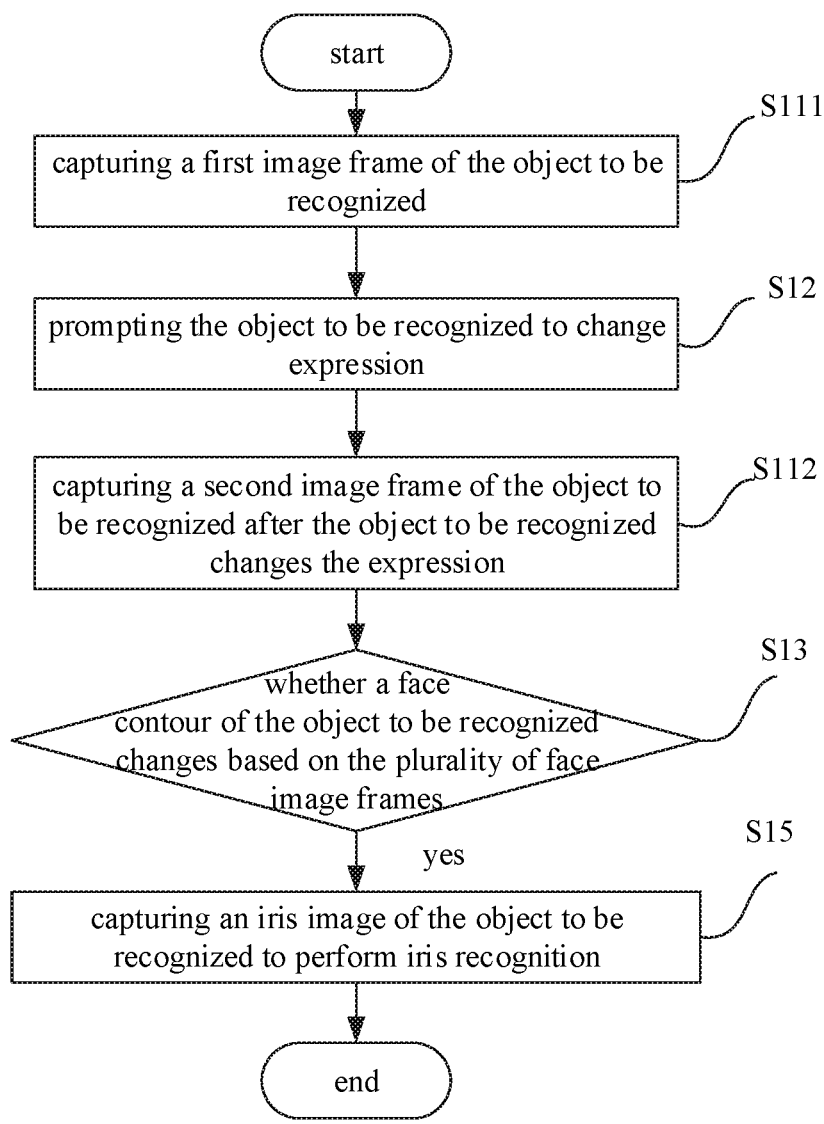
FIG. 4 is a flow chart illustrating an iris recognition method according to some embodiments of the present disclosure.

In some embodiments, if the electronic device 100 may include an iris recognition module 20, capturing the plurality of face image frames of the object to be recognized in S11 may include the following acts, as illustrated in FIG. 4.

S111, a first image frame of the object to be recognized is captured.

The iris recognition method according to embodiments of the present disclosure may include act S12.

S12, the object to be recognized is prompted to change expression.

S112, a second image frame of the object to be recognized is captured after the object to be recognized changes the expression.

Figure 5:
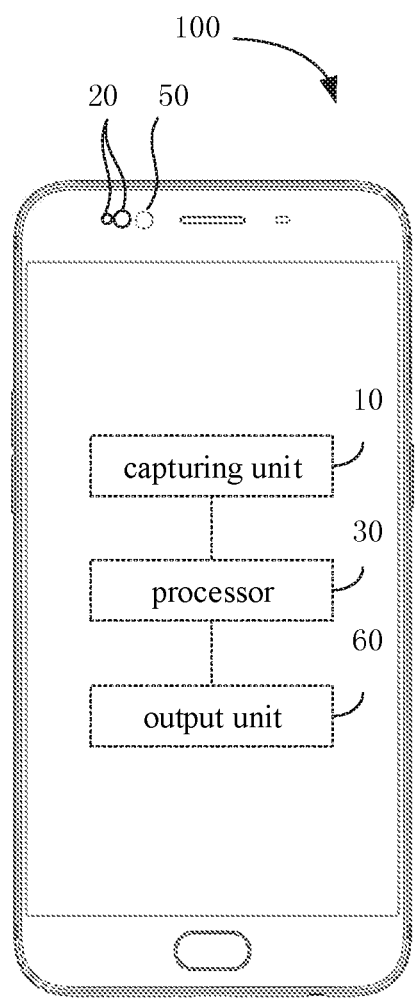
FIG. 5 is a block diagram illustrating an electronic device according to some embodiments of the present disclosure.

As illustrated in FIG. 5, in some embodiments, the electronic device 100 further includes an output unit 60. Act S111 and act S112 may be implemented by the capturing unit 10. Act S12 may be implemented by the output unit 60.

That is, the capturing unit 10 may be configured to capture the first image frame of the object to be recognized. The output unit 60 may be configured to prompt the object to be recognized to change the expression. The capturing unit 10 may be further configured to capture the second image frame of the object to be recognized after the object to be recognized changes the expression.

As illustrated in FIG. 3 again, in some embodiments, the one or programs 41 further include instructions for performing the following acts.

S111, a first image frame of the object to be recognized is captured.

S12, the object to be recognized is prompted to change expression.

S112, a second image frame of the object to be recognized is captured after the object to be recognized changes the expression.

The capturing unit 10 captures the first frame image when the face of the object to be recognized has first expression. Then, the output unit 60 prompts the object to be recognized to change the expression. After the object to be recognized changes the expression, the capturing unit 10 captures the second frame image when the face of the object to be recognized has second expression. The output unit 60 may prompt the object to be recognized to change to predetermined expression. For example, the output unit 60 may prompt the object to be recognized to make the predetermined expression such as laughing and being surprised. Alternatively, the output unit 60 may prompt the object to be recognized to change the expression, but does not limit that the object to be recognized must make the predetermined expression.

The output unit 60 may be a display screen or a speaker of the electronic device 100. The manner of prompting the object to be recognized to change the expression by the output unit 60 may include a voice, a text, a dynamic graphics, a voice with dynamic graphics, a voice with text, a dynamic graphics with text, and the like. For example, the output unit 60 issues a voice signal "please make the laughing expression" to prompt the object to be recognized to change the expression, or the output unit 60 displays a text content of "please make the laughing expression" to prompt the object to be recognized to change the expression.

As illustrated in FIG. 2 again, in some embodiments, the capturing unit 10 may be the iris recognition module 20. In some embodiments, the electronic device 100 further includes a visible-light camera 50. The capturing unit 10 may also be the visible-light camera 50. Capturing the plurality of face image frames of the object to be recognized may include: capturing face images by the iris recognition module 20, or capturing face images by the visible-light camera 50.

Figure 6:
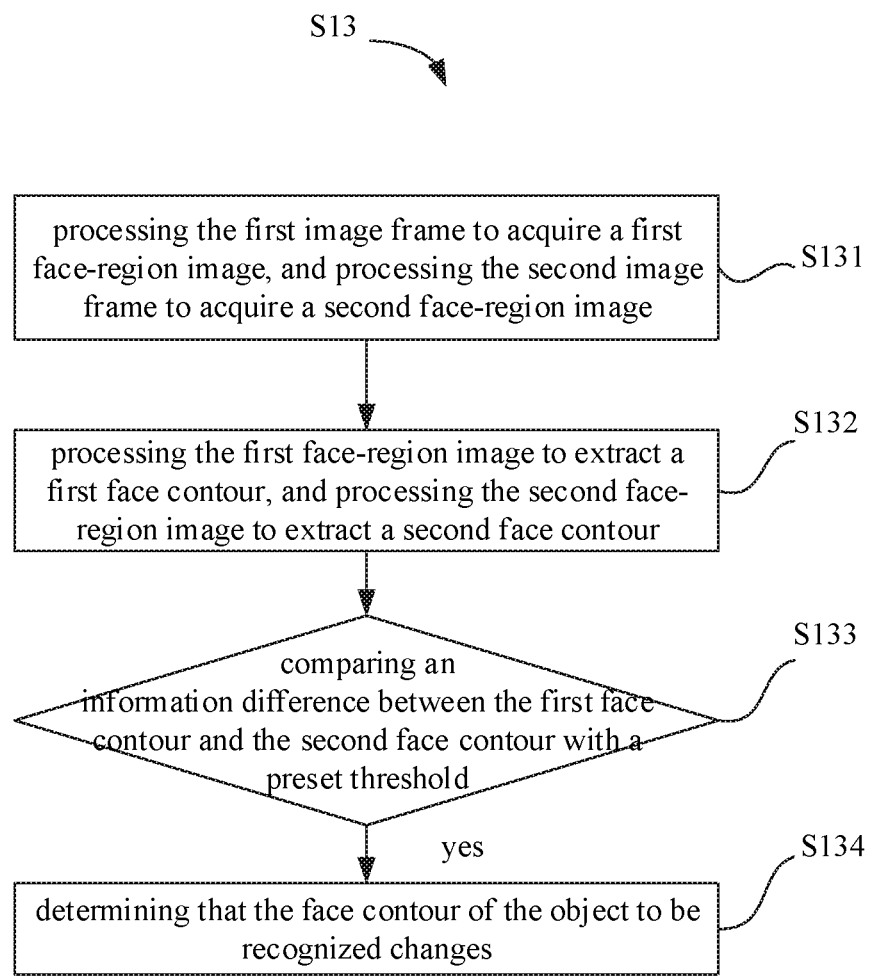
FIG. 6 is a flow chart illustrating an iris recognition method according to some embodiments of the present disclosure.

As illustrated in FIG. 6, in some embodiments, determining whether the face contour of the object to be recognized changes based on the plurality of face image frames in act S13 may include following acts.

S131, the first image frame is processed to acquire a first face-region image, and the second image frame is processed to acquire a second face-region image.

S132, the first face-region image is processed to extract a first face contour, and the second face-region image is processed to extract a second face contour.

S133, an information difference between the first face contour and the second face contour is compared with a preset threshold.

S134, it is determined that the face contour of the object to be recognized changes when the information difference is greater than the preset threshold.

As illustrated in FIG. 2 again, in some embodiments, act S131, act S132, act S133 and act S134 may all be implemented by the processor 30.

That is, the processor 30 may be configured to:

process the first image frame to acquire a first face-region image, and process the second image frame to acquire a second face-region image;

process the first face-region image to extract a first face contour, and process the second face-region image to extract a second face contour;

compare an information difference between the first face contour and the second face contour with a preset threshold; and determine that the face contour of the object to be recognized changes when the information difference is greater than the preset threshold.

As illustrated in FIG. 3 again, in some embodiments, the one or programs 41 further include instructions for performing the following acts.

S131, the first image frame is processed to acquire a first face-region image, and the second image frame is processed to acquire a second face-region image.

S132, the first face-region image is processed to extract a first face contour, and the second face-region image is processed to extract a second face contour.

S133, an information difference between the first face contour and the second face contour is compared with a preset threshold.

S134, it is determined that the face contour of the object to be recognized changes when the information difference is greater than the preset threshold.

In some embodiments, it takes the visible-light camera 50 as an example to capture face images. First, a face region may be extracted from the first image frame to acquire the first face-region image, and a face region may be extracted from the second image frame to acquire the second face-region image. In detail, a face region and a non-face region may be separated from each other based on skin color. The processor 30 converts the first image frame in a RGB (Red Green Blue) format into the first image frame in an YCrCb (Y represents luminance, Cr represents red-difference Chroma component, and Cb represents blue-difference Chroma component) format, and converts the second image frame in the RGB format into the second image frame in the YCrCb format. Subsequently, each pixel in the first image frame in the YCrCb format is detected and each pixel in the second image frame in the YCrCb format is detected. If color data of the pixel falls within a preset range, i.e., $133 \leq Cr \leq 173$ and $177 \leq Cb \leq 127$, this pixel belongs to a skin region. In this way, the first face-region image and the second face-region image may be acquired. However, the first face-region image and the second face-region image may further include an image of a neck region. Therefore, it needs to remove the neck region. In detail, the neck region may be removed based on an aspect ratio of the face to acquire an accurate face region. Subsequently, the processor 30 may process the first face-region image by an edge extraction algorithm to acquire the first face contour, and process the second face-region image by an edge extraction algorithm to acquire the second face contour. The processor 30 compares the information difference between the first face contour and the second face contour with the preset threshold. The processor 30 determines that the face contour of the object to be recognized changes when the information difference is greater than the preset threshold. In some embodiments, the information difference refers to a non-matching degree between a shape of the first face contour and a shape of the second face contour. The non-matching degree is greater than the preset threshold that is set based on the non-matching degree, which means that the face contour of the object to be recognized changes. In some embodiments, the information difference refers to an area difference between the first face contour and the second face contour. The area difference is greater than the preset threshold that is set based on the area difference, which means that the face contour of the object to be recognized changes.

In some embodiments, the capturing unit 10 may capture two face image frames, and determine whether the iris is a living one by comparing the face contours in the two face image frames. In other embodiments, the capturing unit 10 may capture the plurality of face image frames, such as three frames, four frames, etc., and determine whether the iris is the living one by comparing the face contours in the plurality of face image frames change. It takes the capturing unit 10 to capture three face image frames as an example. During a capturing process, the capturing unit 10 may capture one face image frame and capture two face image frames after the object to be recognized is prompted to change the expression. Alternatively, the capturing unit 10 may capture one face image frame, and capture one face image frame after the object to be recognized is prompted to change the expression. Then, the electronic device 100 again prompts the object to be recognized to change the expression, and one face image frame may be captured again. Therefore, three face image frames may be acquired. Alternatively, the capturing unit 10 may capture two face image frames and capture one face image frame after the object to be recognized is prompted to change the expression. In other words, the capturing unit 10 needs to capture the face image frames under at least two expression states of the object to be recognized. In this way, it may detect whether the iris is a living one by comparing the face image frames.

Figure 7:
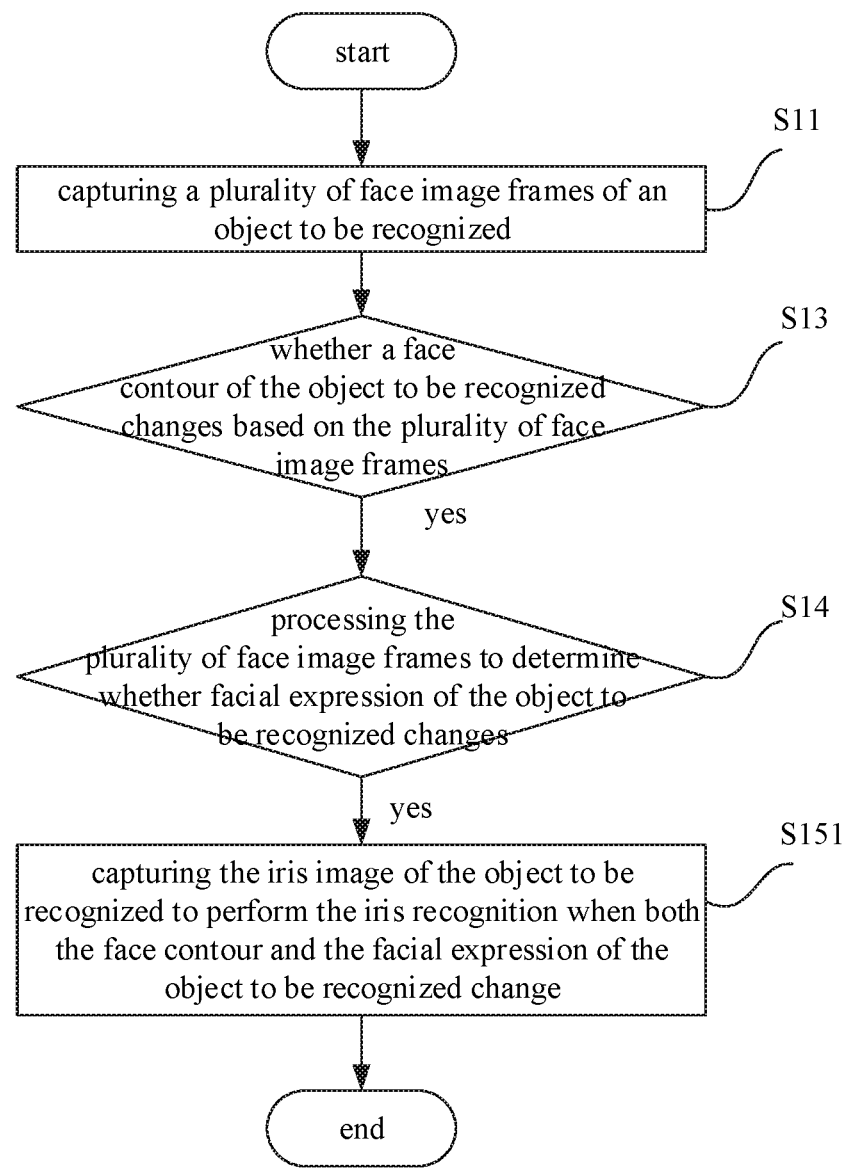
FIG. 7 is a flow chart illustrating an iris recognition method according to some embodiments of the present disclosure.

As illustrated in FIG. 7, in some embodiments, the iris recognition method according to the embodiments of the present disclosure further includes the following acts.

S14, the plurality of face image frames are processed to determine whether facial expression of the object to be recognized changes.

Capturing the iris image of the object to be recognized to perform the iris recognition when the face contour changes in act S15 may include act S151.

S151, the iris image of the object to be recognized is captured to perform the iris recognition when both the face contour and the facial expression of the object to be recognized change.

As illustrated in FIG. 2, in some embodiments, act S14 may be implemented by the processor 30. Act S151 may be implemented by the iris recognition module 20.

That is, the processor 30 is further configured to:
process the plurality of face image frames to determine whether facial expression of the object to be recognized changes.

The iris recognition module 20 is further configured to:
capture the iris image of the object to be recognized to perform the iris recognition when both the face contour and the facial expression of the object to be recognized change.

As illustrated in FIG. 3, in some embodiments, the one or more programs 41 further include instructions for performing the following acts.

S14, the plurality of face image frames are processed to determine whether facial expression of the object to be recognized changes.

S151, the iris image of the object to be recognized is captured to perform the iris recognition when both the face contour and the facial expression of the object to be recognized change.

Therefore, when it is determined that the face contour of the object to be recognized changes, the processor 20 determines whether the facial expression of the object to be recognized changes by processing the first image frame and the second image frame. When it is determined that the iris is a living one when the facial expression of the object to be recognized change. The iris recognition module 20 then captures the iris image for the iris recognition. It should be understood that, in some practical scenarios, after the object to be recognized changes the expression, the face contour does not change significantly. At this time, it is possible to more accurately detect whether the iris is a living one through the expression recognition, thereby avoiding misjudgment.

Figure 8:
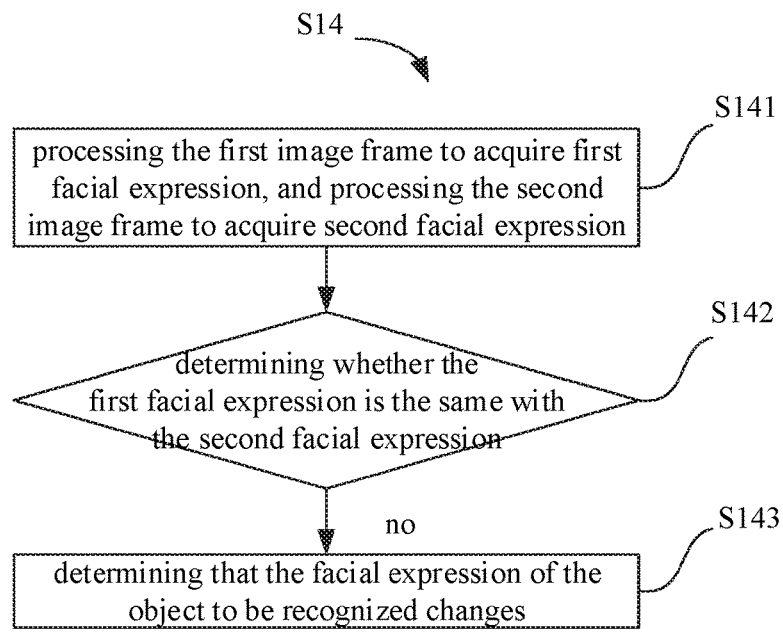
FIG. 8 is a flow chart illustrating an iris recognition method according to some embodiments of the present disclosure.

As illustrated in FIG. 8, in some embodiments, processing the plurality of face image frames to determine whether the facial expression of the object to be recognized changes in act S14 may include the following acts.

S141, the first image frame is processed to acquire first facial expression, and the second image frame is processed to acquire second facial expression.

S142, it is determined whether the first facial expression is the same with the second facial expression.

S143, when the first facial expression is different from the second facial expression, it is determined that the facial expression of the object to be recognized changes.

As illustrated in FIG. 2, in some embodiments, act S141, act 142 and act 143 all may be implemented by the processor 30.

That is, the processor 30 is configured to:
process the first image frame to acquire first facial expression, and process the second image frame to acquire second facial expression;
determining whether the first facial expression is the same with the second facial expression; and
when the first facial expression is different from the second facial expression, determine that the facial expression of the object to be recognized changes.

As illustrated in FIG. 3, in some embodiments, the one or more programs 41 further include instructions for performing the following acts.

S141, the first image frame is processed to acquire first facial expression, and the second image frame is processed to acquire second facial expression.

S142, it is determined whether the first facial expression is the same with the second facial expression.

S143, when the first facial expression is different from the second facial expression, it is determined that the facial expression of the object to be recognized changes.

In some embodiments, the processor 30 may acquire the first facial expression by performing the processing such as feature extraction and facial expression classification on the first image frame. The processor 30 may acquire the second facial expression by performing the processing such as feature extraction and facial expression classification on the second image frame. Sizes of facial organs such as eyes, eyebrows, mouth and the like and distances between various organs may be used as attribute features based a geometric feature method as so to perform the facial feature extraction on the first image frame and the second image frame. After the facial features are extracted, expression classification recognition may be performed based on the extracted facial features to obtain the first facial expression and the second facial expression. If it is detected that the first facial expression and the second facial expression are not the same, for example, the first facial expression is a smile and the second facial expression is a happy laugh, the first facial expression is not the same with the second facial expression. In this case, the facial expression of the object to be recognized is considered to change. Further, the iris that is currently captured is considered to be the living one. The iris recognition module 20 then captures the iris image for iris recognition. Since the change of facial expression is more easily detected than the change of the face contour, the accuracy of living iris detection can be greatly improved.

Figure 9:
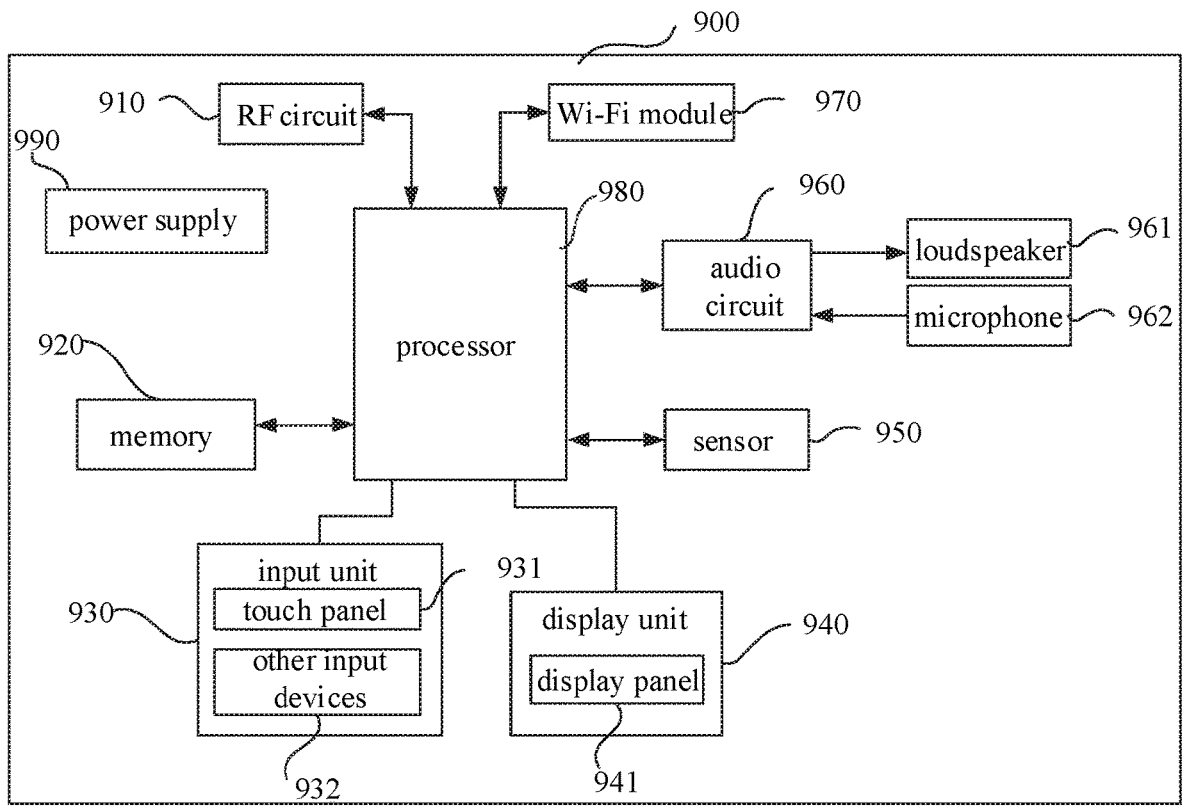
FIG. 9 is a schematic diagram of an internal structure of an electronic device according to some embodiments of the present disclosure.

FIG. 9 is a schematic diagram of an internal structure of an electronic device according to an embodiment of the present disclosure. With reference to FIG. 9, the electronic device 900 includes a radio frequency (RF) circuit 910, a memory 920, an input unit 930, a display unit 940, a sensor 950, an audio circuit 960, a wireless fidelity (Wi-Fi) module 970, a processor 980 and a power supply 990, and the like. It may be understood by those skilled in the art that the structures of the electronic device 900 illustrated in FIG. 9 do not limit the structures of the electronic device. The electronic device may include less or more components than those illustrated in FIG. 9 or combinations thereof, or have a different arrangement of components.

The RF circuit 910 may be configured to receive or transmit a signal during a process of transmitting or receiving a message or making a call. The RF circuit 910 may be configured to receive downlink data from a base station and to transmit the downlink data to the processor 980. Alternatively, the RF circuit 910 may be configured to transmit uplink data to the base station. In general, the RF circuit includes but is not limited to an antenna, at least one amplifier, a transceiver, a coupler, a low noise amplifier (LNA), a diplexer and the like. Furthermore, the RF circuit 910 may be further configured to communicate with other devices via wireless communication and network. The above wireless communication may adopt any communication standard or protocol, which includes but is not limited to global system of mobile communication (GSM), general packet radio service (GPRS), code division multiple access (CDMA), wideband code division multiple access (WCDMA), long term evolution (LTE), e-mail, short messaging service (SMS) and the like.

The memory 920 may be configured to store software programs or modules. The processor 980 is configured to execute various functional applications and data processes of the electronic device 900 by running the software programs and modules stored in the memory 920. The memory 920 may mainly include a program storage region and a data storage region. The program storage region may store an operation system, at least one function required applications (such as an application having a sound playing function, an application having an image playing function) and the like. The data storage region may store data produced by using the electronic device 900 (such as audio data, an address book) and the like. In addition, the memory 920 may include a high speed random access memory and may include a non-volatility memory, such as at least one disk memory, a flash memory, or other volatility solid state memory.

The input unit 930 may be configured to receive figure or character information inputted and generate a key signal input related to a user setup or function control of the electronic device 900. In detail, the input unit 930 may include a touch panel 931 and other input devices 932. The touch panel 931 (also called as touch screen) may be configured to gather touch operations near or on the touch panel 931 (such as an operation on the touch panel 931 or near the touch panel 931 of the user with a finger, a stylus or other suitable objects or attachments), and drive corresponding connected device according to a preset program. In an embodiment, the touch panel 931 may include a touch detection device and a touch controller. The touch detection device detects an orientation of the user's touch, detects a signal caused by the touch operation and sends the signal to the touch controller. The touch controller receives the touch information on the touch detection device, converts the touch information to touch point coordinates, and sends the touch point coordinates to the processor 980. Furthermore, the touch controller may receive and execute a command sent from the processor 980. The touch panel 931 may be implemented as resistance typed, capacitive typed, infrared typed and surface acoustic wave typed. In addition to the touch panel 931, the input unit 930 may further include other input devices 932. In detail, the other input devices 932 may include but without limitation to one or more of a physical keyboard, a functional key (such as a volume control key, a switch key and the like).

The display unit 940 may be configured to display information inputted by the user or information provided to the user or various menus of the electronic device 900. The display unit 940 may include a display panel 941. In an embodiment, the display panel 941 may be configured as a liquid crystal display (LCD), an organic light-emitting diode (OLED) and the like. In an embodiment, the touch panel 931 may cover the display panel 941. When the touch panel 931 detects the touch operation on the touch panel 931 or near the touch panel 931, the touch operation is transmitted to the processor 980 to determine a type of the touch event. Thereafter, the processor 980 provides a corresponding visual output on the display panel 941 according to the type of the touch event. Although the touch panel 931 and the display panel 941 are two separate components to realize an input and output function of the electronic device 900 illustrated in FIG. 9, in certain embodiments, the touch panel 931 and the display panel 941 may be integrated to realize the input and output function of the electronic device 900, The electronic device 900 may further include at least one sensor 950, such as a gyroscope, an optical sensor, a motion sensor and other sensors. In detail, the gyroscope is configured to collect a rotation angular velocity of the electronic device 900. The optical sensor may include a surrounding light sensor and a proximity sensor. The surrounding light sensor may adjust a brightness of the display panel 941 according to surrounding lights. The proximity sensor may close the display panel 941 and/or backlight when the electronic device 900 moves near ears of the user. The motion sensor may include an acceleration sensor, for measuring the acceleration value in various directions via the acceleration sensor, measuring a value and a direction of gravity when the electronic device 900 is static, and identifying a state of the electronic device 900 (such as landscape screen and portrait screen switching), jitter related functions (such as a pedometer, a knocking) and the like. Furthermore, the electronic device 900 may be configured with a barometer, a hygrometer, a thermometer, an infrared sensor and other sensors.

The audio circuit 960, a loudspeaker 961 and a microphone 962 may provide an audio interface between the user and the electronic device 900. The audio circuit 960 may transmit an electrical signal converted from the audio data received to the loudspeaker 961. The loudspeaker 961 converts the electrical signal to a sound signal and output the sound signal. In another aspect, the microphone 962 may convert gathered sound singles to electrical signals. The audio circuit 960 receives and converts the electrical signals to audio data and outputs the audio data to the processor 980 to be processed. The audio data processed by the processor 980 may be transmitted to another electronic device via the RF circuit 910 or may be stored in the memory 920 to be subsequently processed.

Wi-Fi is a short distance wireless communication technology. The electronic device 900 may help the user to receive or send an e-mail, search webpages, access to stream medium via the Wi-Fi module 970. The Wi-Fi module 970 provides a wireless broadband Internet access. Although the Wi-Fi module 970 is illustrated in FIG. 9, it may be understood that, the Wi-Fi module 970 is not necessary for the electronic device 900, thus it may be omitted according to demands.

The processor 980 is a control center of the electronic device 900, which utilizes various interfaces and wires to connect various parts of the electronic device 900. By running or executing the software program and/or modules stored in the memory 920, and by invoking data stored in the memory 920, the various functions and data processing functions may be executed, thus integrally monitoring the electronic device 900. In an embodiment, the processor 980 may include one or more processing units. In an embodiment, the processor 980 may be integrated with an application processor or a modem processor. The application processor mainly processes the operation system, a user interface and an application. The modem processor mainly processes wireless communication. It may be understood that, the above modem controller may be not integrated in the processor 980.

The electronic device 300 may further include a power supply 990 (such as a battery) for providing powers to various parts of the electronic device. Alternatively, the power supply may be logically connected to a power management system and the processor 980, thereby managing a charging, discharging and power consumption via the power management system.

In an embodiment, the electronic device 900 may further include a camera, a Bluetooth module and the like.

In embodiments of the present disclosure, the processor 980 included in the electronic device may execute the computer programs stored in the memory to achieve the above method, which will be not repeated here.

The computer-readable storage medium according to embodiments of the present disclosure includes computer programs configured to combine with an electronic device capable of photographing. The computer programs are configured to be executed by a processor to perform the iris recognition method according to any one of the above embodiments of the present disclosure.

For example, the computer programs may be executed by the processor to perform the iris recognition method described in the following acts.

S11, a plurality of face image frames of an object to be recognized are captured.

S13, it is determined whether a face contour of the object to be recognized changes based on the plurality of face image frames.

S15, an iris image of the object to be recognized is captured to perform iris recognition when the face contour changes.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, those skilled in the art may combine the different embodiments or examples described in this specification and features of different embodiments or examples without conflicting with each other.

Terms such as "first" and "second" are used herein for purposes of description and are not intended to indicate or imply relative importance or significance or imply the number of technical features. Furthermore, the feature defined by "first" or "second" may indicate or imply including at least one feature. In the description of the present disclosure, "a plurality of" refers to two or more unless otherwise specified.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the functions may be executed in other orders instead of the order illustrated or discussed, including in a basically simultaneous manner or in a reverse order, which should be understood by those skilled in the art.

Any process or method described in a flow chart or described herein in other ways may be understood to be a sequence table of executable instructions for achieving logical functions, which may be realized in any computer-readable medium for being used by the instruction execution system, device or apparatus (for example, the system based on the computer, the system including the processor or other systems capable of reading instructions from the instruction execution system, device or apparatus and executing the instructions) or being used in combination with the instruction execution system, device or apparatus. In the specification, "computer-readable medium" may be any device including, storing, communicating, broadcasting or transmitting programs for being used by the instruction execution system, device or apparatus or being used in combination with the instruction execution system, device or apparatus. Specific examples of the computer-readable medium (non-exhaustiveness list) include: electrical connection (electronic device) having one or one wires, portable computer disk box (magnetic device), random access memory (RAM), read only memory (ROM), electrically programmable read-only-memory (EPROM or flash memory), fiber device, and portable CD-ROM. In addition, the computer-readable medium may even to paper on which programs can be printed or other appropriate medium, this is because optical scanning may be performed on the paper or the other medium, and then edit, interpretation or any other appropriate way if necessary are performed to electrically obtain the programs, and then the programs are stored in the computer storage.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. An iris recognition method, applied for an electronic device, and comprising:
    capturing a first image frame of an object to be recognized;
    prompting the object to be recognized to change expression;
    capturing a second image frame of the object to be recognized after the object to be recognized changes the expression;
    determining whether a face contour of the object to be recognized changes, comprising: processing the first image frame to acquire a first face-region image, and processing the second image frame to acquire a second face-region image, processing the first face-region image to extract a first face contour, and processing the second face-region image to extract a second face contour, comparing an information difference between the first face contour and the second face contour with a preset threshold, and determining that the face contour of the object to be recognized changes when the information difference is greater than the preset threshold, in which the information difference refers to a non-matching degree between a shape of the first face contour and a shape of the second face contour, or the information difference refers to an area difference between the first face contour and the second face contour; and
    capturing an iris image of the object to be recognized to perform iris recognition when the face contour changes.

2. The method according to claim 1, wherein the electronic device comprises an iris recognition module, and the first and second face image frames of the object to be recognized are captured by the iris recognition module;
    or, the electronic device comprises a visible-light camera, and the first and second face image frames of the object to be recognized are captured by the visible-light camera.

3. The method according to claim 1, further comprising:
    processing the first and second face image frames to determine whether facial expression of the object to be recognized changes;
    wherein capturing the iris image of the object to be recognized to perform the iris recognition when the face contour changes comprises:
    capturing the iris image of the object to be recognized to perform the iris recognition when both the face contour and the facial expression of the object to be recognized change.

4. The method according to claim 3, wherein processing the first and second face image frames to determine whether the facial expression of the object to be recognized changes comprises:
    processing the first image frame to acquire first facial expression, and processing the second image frame to acquire second facial expression;
    determining whether the first facial expression is the same as the second facial expression; and
    when the first facial expression is different from the second facial expression, determining that the facial expression of the object to be recognized changes.

5. The method according to claim 1, wherein
    processing the first image frame to acquire a first face-region image comprises:
    extracting a first face region from the first image frame based on skin color; and
    removing a first neck region from the first face region based on an aspect ratio of the face to acquire the first face-region image;
    processing the second image frame to acquire a second face-region image comprises:
    extracting a second face region from the second image frame based on skin color; and
    removing a second neck region from the first face region based on an aspect ratio of the face to acquire the second face-region image.

6. An electronic device, comprising:
    a processor; and
    a non-transitory computer readable storage medium storing computer programs that, when executed by the processor, cause the electronic device to:
    capture a first image frame of an object to be recognized;
    prompt the object to be recognized to change expression;
    capture a second image frame of the object to be recognized after the object to be recognized changes the expression;
    determine whether a face contour of the object to be recognized changes, the determining the face contour of the object to be recognized changes comprising: processing the first image frame to acquire a first face-region image, and processing the second image frame to acquire a second face-region image, processing the first face-region image to extract a first face contour, and processing the second face-region image to extract a second face contour, comparing an information difference between the first face contour and the second face contour with a preset threshold, and determining that the face contour of the object to be recognized changes when the information difference is greater than the preset threshold, in which the information difference refers to a non-matching degree between a shape of the first face contour and a shape of the second face contour, or the information difference refers to an area difference between the first face contour and the second face contour; and
    capture an iris image of the object to be recognized to perform iris recognition when the face contour changes.

7. The electronic device according to claim 6, wherein the first and second face image frames of the object to be recognized are captured by an iris recognition module;
    or, the electronic device comprises a visible-light camera, and the first and second face image frames of the object to be recognized are captured by the visible-light camera.

8. The electronic device according to claim 6, wherein the processor is further configured to:
    process first and second face image frames to determine whether facial expression of the object to be recognized changes;
    capture the iris image of the object to be recognized to perform the iris recognition when both the face contour and the facial expression of the object to be recognized change.

9. The electronic device according to claim 8, wherein the processor is configured to:
    process the first image frame to acquire first facial expression, and process the second image frame to acquire second facial expression;

determining whether the first facial expression is the same as the second facial expression; and when the first facial expression is different from the second facial expression, determine that the facial expression of the object to be recognized changes.

10. The electronic device according to claim 6, wherein the processor is configured to process the first image frame to acquire the first face-region image by acts of: extracting a first face region from the first image frame based on skin color; and removing a first neck region from the first face region based on an aspect ratio of the face to acquire the first face-region image;

wherein the processor is configured to process the second image frame to acquire the first face-region image by acts of: extracting a second face region from the second image frame based on skin color; and removing a second neck region from the first face region based on an aspect ratio of the face to acquire the second face-region image.

11. A non-transitory computer-readable storage medium, comprising computer programs configured to combine with an electronic device capable of photographing, and to be executed by a processor to perform an iris recognition method, the method comprising:

capturing a first image frame of an object to be recognized;

prompting the object to be recognized to change expression;

capturing a second image frame of the object to be recognized after the object to be recognized changes the expression;

determining whether a face contour of the object to be recognized changes, comprising: processing the first image frame to acquire a first face-region image, and processing the second image frame to acquire a second face-region image, processing the first face-region image to extract a first face contour, and processing the second face-region image to extract a second face contour, comparing an information difference between the first face contour and the second face contour with a preset threshold, and determining that the face contour of the object to be recognized changes when the information difference is greater than the preset threshold, in which the information difference refers to a non-matching degree between a shape of the first face contour and a shape of the second face contour, or the information difference refers to an area difference between the first face contour and the second face contour; and capturing an iris image of the object to be recognized to perform iris recognition when the face contour changes.

12. The non-transitory computer-readable storage medium according to claim 11, wherein the method further comprises:

processing the first and second face image frames to determine whether facial expression of the object to be recognized changes;

wherein capturing the iris image of the object to be recognized to perform the iris recognition when the face contour changes comprises:

capturing the iris image of the object to be recognized to perform the iris recognition when both the face contour and the facial expression of the object to be recognized change.

13. The non-transitory computer-readable storage medium according to claim 12, wherein processing the first and second face image frames to determine whether the facial expression of the object to be recognized changes comprises:

processing the first image frame to acquire first facial expression, and processing the second image frame to acquire second facial expression;

determining whether the first facial expression is the same as the second facial expression; and when the first facial expression is different from the second facial expression, determining that the facial expression of the object to be recognized changes.

14. The non-transitory computer-readable storage medium according to claim 11, wherein processing the first image frame to acquire a first face-region image comprises:

extracting a first face region from the first image frame based on skin color; and removing a first neck region from the first face region based on an aspect ratio of the face to acquire the first face-region image;

processing the second image frame to acquire a second face-region image comprises:

extracting a second face region from the second image frame based on skin color; and removing a second neck region from the first face region based on an aspect ratio of the face to acquire the second face-region image.

* * * * *